(12) United States Patent
Ince

(10) Patent No.: US 8,480,309 B2
(45) Date of Patent: Jul. 9, 2013

(54) BEARING CAGE DURABILITY IMPROVEMENT

(75) Inventor: Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 184 days.

(21) Appl. No.: 13/083,936

(22) Filed: Apr. 11, 2011

(65) Prior Publication Data

US 2011/0249930 A1 Oct. 13, 2011

Related U.S. Application Data

(60) Provisional application No. 61/323,091, filed on Apr. 12, 2010.

(51) Int. Cl.
*F16C 33/46* (2006.01)
(52) U.S. Cl.
USPC .......................................... 384/575; 384/623

(58) Field of Classification Search
USPC ........................................ 384/623, 621, 575
See application file for complete search history.

(56) References Cited

U.S. PATENT DOCUMENTS

| | | | | |
|---|---|---|---|---|
| 3,240,542 A | * | 3/1966 | Jahn | 384/623 |
| 3,442,562 A | * | 5/1969 | Teufel et al. | 384/575 |
| 3,778,124 A | * | 12/1973 | Alling | 384/623 |
| 5,255,985 A | * | 10/1993 | Alling | 384/575 |
| 2007/0280575 A1 | * | 12/2007 | Obayashi et al. | 384/623 |

* cited by examiner

*Primary Examiner* — Thomas R Hannon
(74) *Attorney, Agent, or Firm* — Lucas & Mercanti, LLP

(57) ABSTRACT

The bearing cage for roller bearings has an inner ring, an outer ring, and a plurality of cage bars extending between the inner ring and the outer ring so as to form a plurality of pockets. At least one of the inner ring and the outer ring has a formed ring flange protruding inwardly into the pockets. The pockets have of least one curved end with a radius or a straight end with large radii so that the pockets extend under the ring flange. The formed ring flange provides radial guidance to the ends of the rolling elements, which also aids in reducing the possibilities of stress risers from forming, causing fatigue and ultimately failure of the bearing cage.

12 Claims, 6 Drawing Sheets

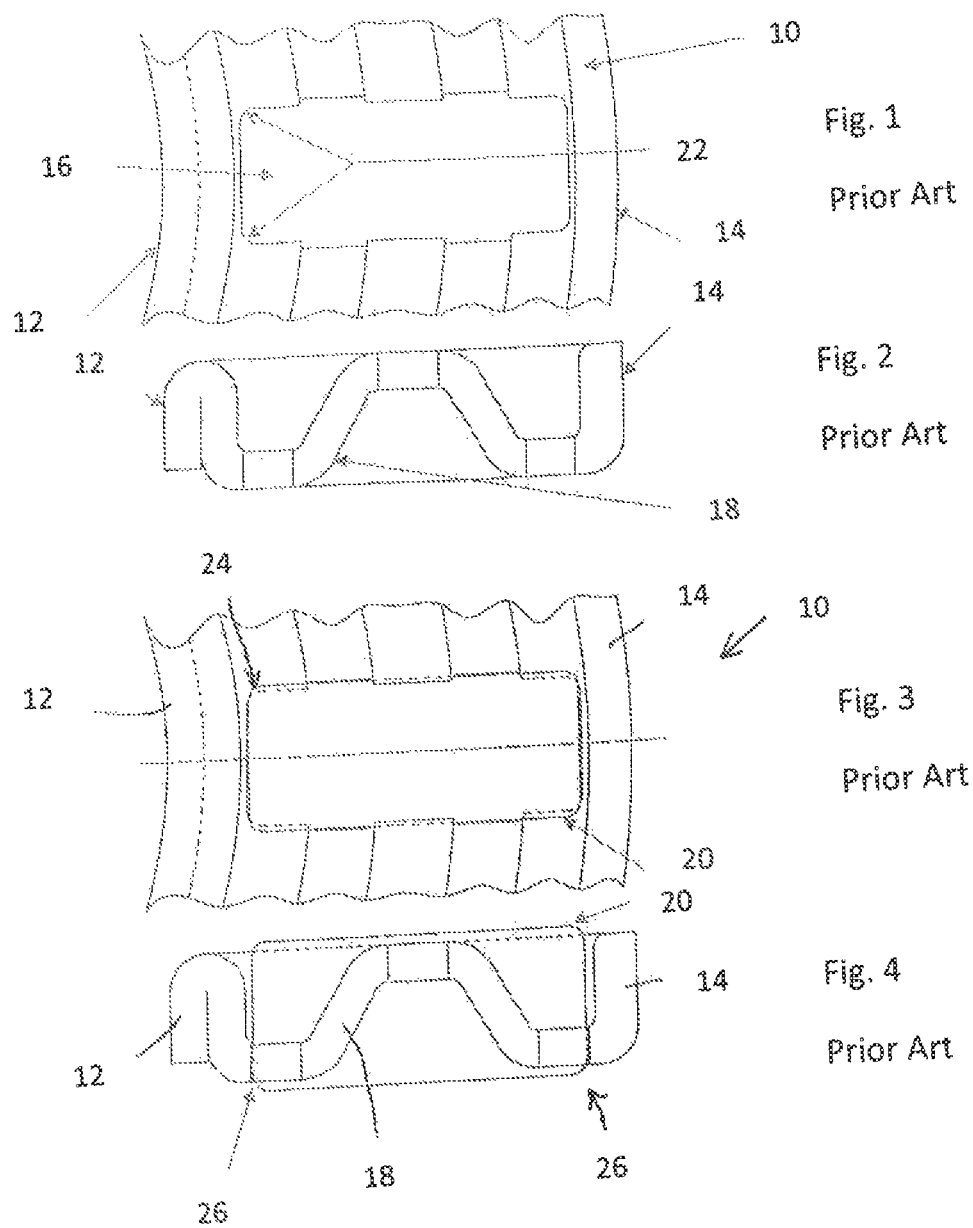

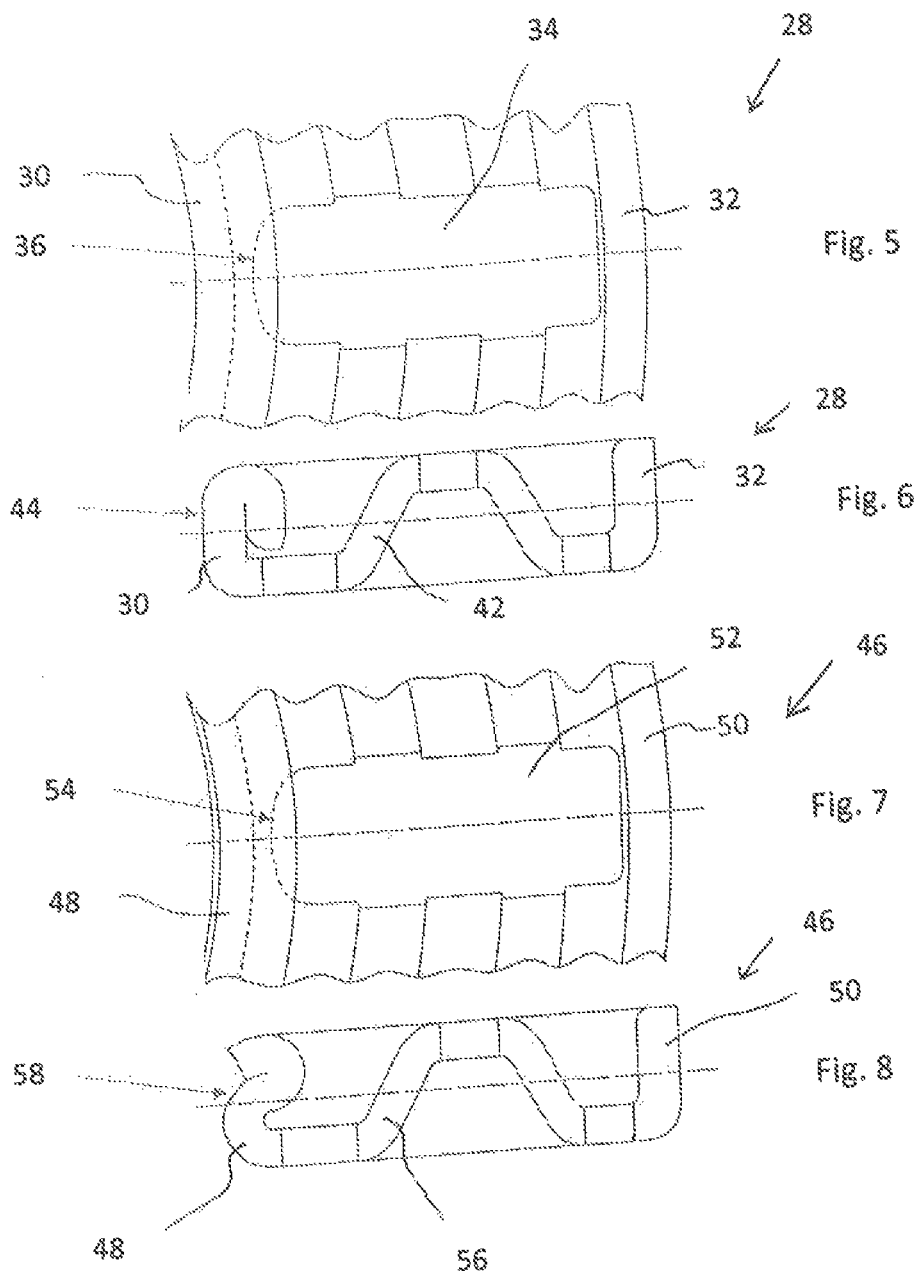

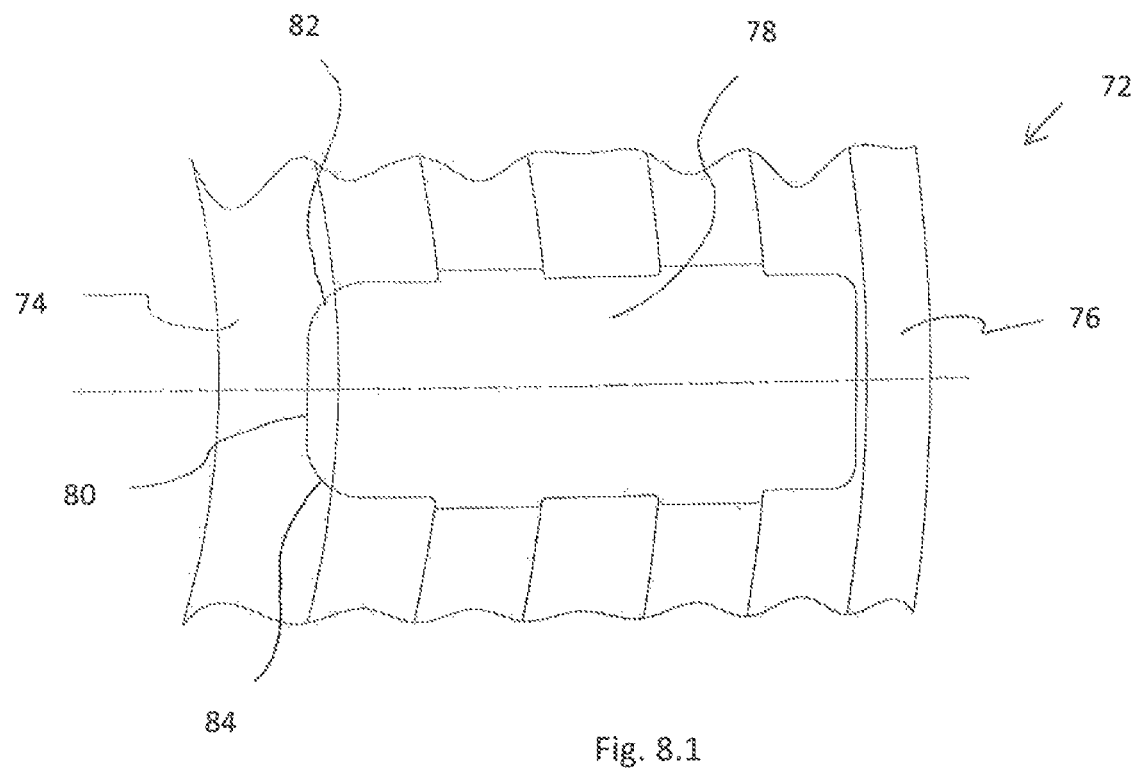
Fig. 8.1

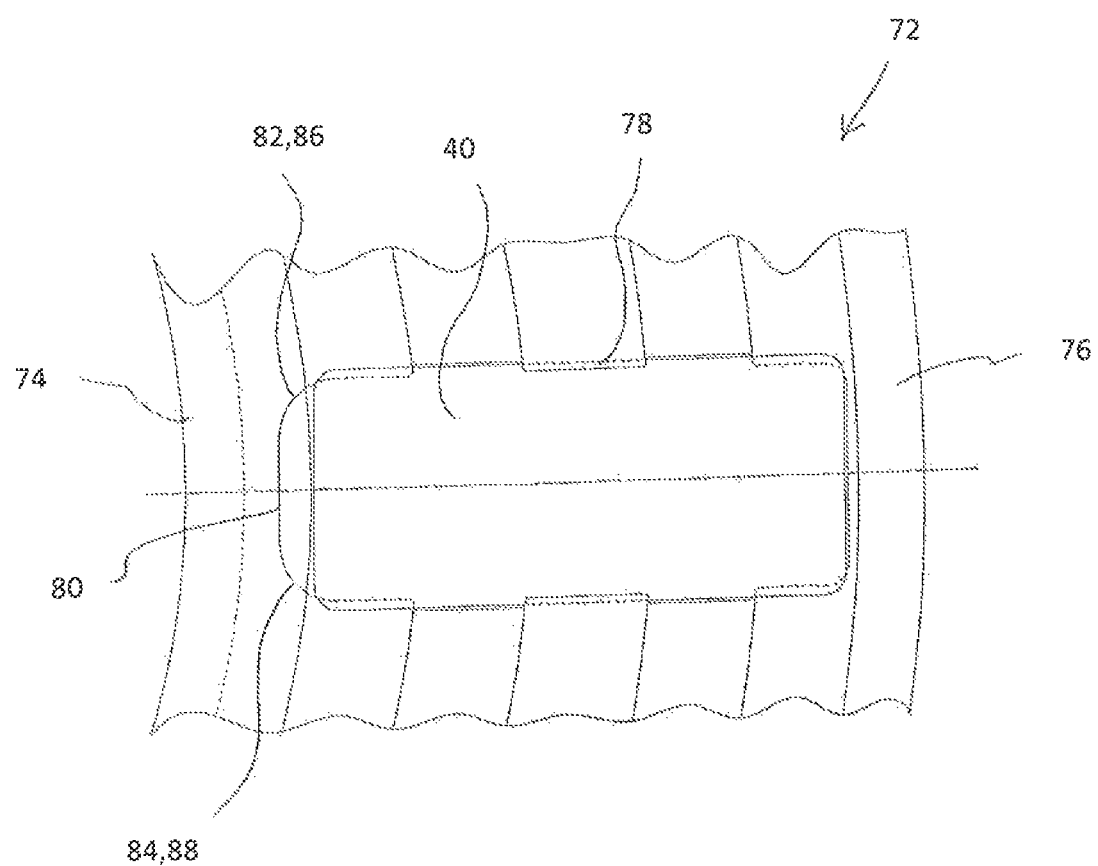
Fig. 8.2

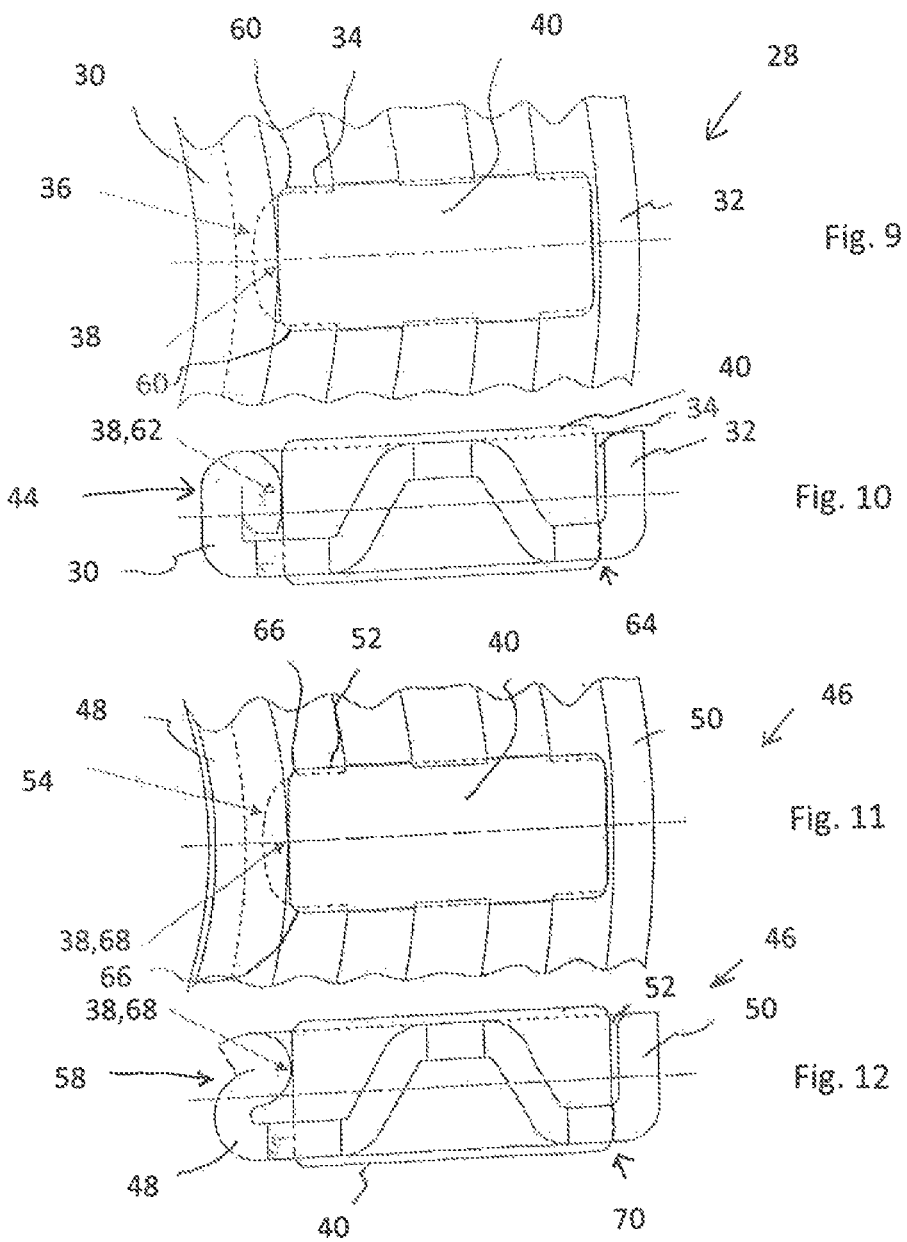

BEARING CAGE DURABILITY IMPROVEMENT

This application claims the priority of U.S. Pat. No. 61/323,091 which is incorporated by reference herein.

FIELD OF INVENTION

The present invention relates to bearings and more particularly to the reduction of stress and the improvement of radial guidance of rolling elements in bearings.

BACKGROUND OF THE INVENTION

Bearings are typically used as anti-friction units allowing rotation around a shaft and/or housing. Bearings are capable of handling thrust loads and forces up to a predetermined rating. At times, bearings are subject to extreme loading and micro-slipping forces that can cause roller cage failure.

Bearing cages typically consist of an inner ring, an outer ring, and web-like cage bars that connect the rings. The cage bars are created by piercing to provide a pocket for rolling elements. The cage bars retain, separate, and guide rolling elements in bearings circumferentially and axially. Radially, the rolling elements are guided by the pierced ends of the pockets.

Due to the stress on the cage, the cage bars can fracture at the point of connection with the inner ring and/or the outer ring. This is due in large part to the small radii that are required at the corners of the pocket so as to not interfere with the rolling element radius or end configuration. These small radii are stress risers. Also, with existing cage designs the radial guidance of the roiling elements is poor on the rough pierced surface at the ends of the pocket, which may include small cracks that are also stress risers.

SUMMARY OF THE INVENTION

The present invention is directed to a bearing cage for an axial bearing or a thrust bearing by providing a pocket that has a large pierced radius at an end of the pocket, or providing a pocket that has a straight end and an end with enlarged radii. The large radius or enlarged radii at a cage pocket end minimizes failures caused by stress risers, without interfering with the rolling elements. The longer pocket will extend under the flange.

Also, the present invention is directed to a cage ring flange(s), which provides radial guidance to the end(s) of the rolling elements. The cage ring flange(s) can be incorporated at the inner ring, the outer ring, or both the inner ring and the outer ring. If the cage ring flange is used at only the inner ring or the outer ring, the cage ring flange will provide guidance at one end of the roller, at that side of the cage and the other end of the roller will be guided by the pierced end.

The combined features of the present invention provide a robust precision roller cage, minimizing possible cage failures, as well as, providing guidance for the rolling elements.

Broadly, the present invention can be defined as a roller bearing cage that comprises an inner ring, an outer ring, and a plurality of cage bars extending between the inner ring and the outer ring so as to form a plurality of pockets. At least one of the inner ring and the outer ring has a formed ring flange protruding inwardly into the pockets. The pockets have at least one curved end with a radius or a straight end with large radii so that the pockets extend under the ring flange.

In an additional embodiment, the formed ring flange is at the inner ring.

In a further embodiment, the formed ring flange is at the outer ring.

In another embodiment, both the outer ring and the inner ring have a ring flange that protrudes inwardly into the pockets.

In a further embodiment, the pockets are pierced.

In another embodiment, the cage is for an axial roller bearing.

In yet another embodiment, the cage is for a thrust roller bearing.

In a further embodiment, the formed ring flange is curled inwardly.

In an even further embodiment, the formed ring flange is parallel to at least one of the inner ring and the outer ring.

In yet a further embodiment, the formed ring flange is S-shaped.

In another embodiment, rolling elements are positioned within the pockets.

In yet another embodiment, the roller bearing cage has spacers, which provide guidance to ends of the rolling elements.

BRIEF DESCRIPTION OF THE DRAWINGS

The present invention will be further understood and appreciated by reading the following description in conjunction with the accompanying drawings, in which:

FIG. 1 is a top view illustrating a prior art axial cage and pocket;

FIG. 2 is a cross-sectional view of a prior art cage;

FIG. 3 is a top view illustrating the prior art axial cage and pocket with a rolling element positioned within the pocket;

FIG. 4 is a cross-sectional view of the prior art cage defining the existing radial rolling element guidance;

FIG. 5 is top view of the inventive cage and pocket with a pierced radius at one of the ends of the pocket;

FIG. 6 is a cross-sectional view of another embodiment of the cage of FIG. 5, illustrating a formed ring flange configuration;

FIG. 7 is top view of the cage and pocket with a pierced radius at one of the ends of the pocket;

FIG. 8 is a cross-sectional view of the cage of FIG. 7;

FIG. 8.1 is a top view of the cage and pocket with a straight end and an enlarged radii at the other end;

FIG. 8.2 is a top view illustrating the cage and pocket of FIG. 8.1 with a rolling element positioned within the pocket;

FIG. 9 is a top view illustrating the cage and pocket of FIG. 5 with a rolling element positioned within the pocket;

FIG. 10 is a cross-sectional view of the cage of FIG. 5, defining the radial rolling element guidance;

FIG. 11 is a top view illustrating the cage and pocket of FIG. 7 with a rolling element positioned within the pocket;

FIG. 12 is a cross-sectional view of the cage of FIG. 7, defining the radial rolling element guidance;

DETAILED DESCRIPTION OF THE INVENTION

Figure 13:
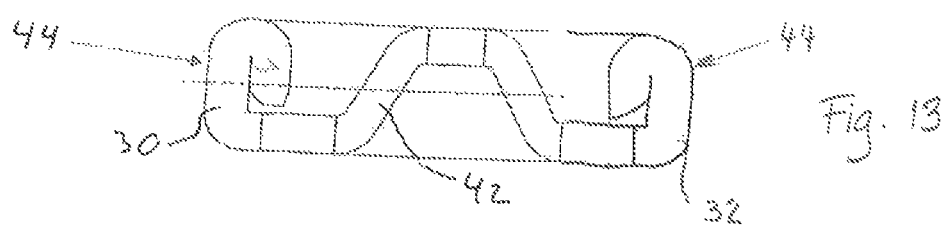
FIG. 13 is a cross-sectional view of a cage according to another embodiment.

Referring now to the drawings, in which like reference numerals refer to like reference parts throughout, FIG. 1 shows a top view of an existing axial bearing cage 10 that has a radially inner ring 12 and a radially outer ring 14. Between the inner ring 12 and the outer ring 14, are cage pockets 16.

FIG. 2 shows a cross-sectional view of the existing axial bearing cage 10. The cage 10 has alternating web-like cage bars 18 between the inner ring 12 and the outer ring 14. The web-like cage bars 18 are created by piercing, which forms the pockets 16.

FIG. 3 again shows a top view of the existing axial bearing cage 10. Rolling elements 20 are positioned in the pockets 16 of the cage 10. The pockets 16 define the boundary in which the rolling elements 20 are permitted to travel. The pockets 16 of the bearing cage 10 have small radii at their corners 22 (shown in FIG. 1) to prevent interference with the edge radius 24 of the rolling element 20.

FIG. 4 again shows a cross-sectional view of the existing axial bearing cage 10 with the alternating web-like cage bars 18 between the inner ring 12 and the outer ring 14. The rolling elements 20 are positioned in the pockets 16 of the cage 10, between the inner ring 12 and the outer ring 14. The cage bars 18 retain, separate, and guide the rolling elements 20 circumferentially and axially. Radially relative to the cage 10, the rolling elements 20 are guided by the pierced ends 26 of the pockets 16.

FIG. 5 shows a top view of an axial bearing cage 28 that has an inner ring 30 and an outer ring 32. Between the inner ring 30 and the outer ring 32, are cage pockets 34, which have at least one curved end 36. The curved ends of the pockets 34 extend under a ring flange, or rim, 44 (shown in FIG. 6) and provide clearance for the ends 38 of the rolling elements 40 (shown in FIGS. 9-10), reducing the possibilities of failure caused by stress risers.

FIG. 6 shows a cross-sectional view of the axial bearing cage 28. The bearing cage 28 has alternating web-like cage bars 42 that extend between the inner ring 30 and the outer ring 32. The web-like cage bars 42 are created by piercing, forming the pockets 34. The cage bars 42 retain, separate, and guide the rolling elements 40. The inner ring 30 has a ring flange, or rim 44, which protrudes inward, into the pocket 34 opening. The ring flange 44 is an extension of the inner ring 30, curling in the direction of the pocket 34 and then parallel to the inner ring 30, providing radial guidance to the ends 38 of the rolling elements 40. The formed ring flange 44 can also be provided at the outer ring 32 or at both the inner ring 30 and the outer ring 32. Spacers (not shown) can be used instead of a flange 44, 58 to provide guidance to the ends 38 of the rolling element 40.

FIG. 7 shows a top view of an alternative axial bearing cage 46 that has an inner ring 48 and an outer ring 50. Between the inner ring 48 and the outer ring 50, are cage pockets 52, which have at least one curved end 54. The curved ends of the pockets extend under the inner ring, or rim, 48 and the pockets 52 provide clearance to the ends 38 of the rolling elements 40, reducing the possibilities of failure caused by stress risers.

FIG. 8 shows a cross-sectional view of the axial bearing cage 46. The bearing cage 46 has alternating web-like cage bars 56 that extend between the inner ring 48 and the outer ring 50. The inner ring 48 has a ring flange 58, which protrudes inward, into the pocket 52 opening. The ring flange 58 is an extension of the inner ring 48 that is S-shaped and curves inward, in the direction of the pocket 52, providing radial guidance to the ends 38 of the rolling elements 40. The formed ring flange 58 can also be provided at the outer ring 50 or at both the inner ring 48 and the outer ring 50. The contour of the ring flange(s) is/are not limited to those disclosed herein.

FIG. 8.1 shows a top view of an alternative axial bearing cage 72 that has an inner ring 74 and an outer ring 76. Between the inner ring 74 and the outer ring 76, are cage pockets 78, which have at least one flat end 80 with large radii 82, 84, which extend under the inner ring, or rim, 74. The pockets 78 provide clearance to the ends 38 of the rolling elements 40 (shown in FIG. 8.2), reducing the possibilities of failure caused by stress risers.

FIG. 8.2 shows a top view of the axial bearing cage 72 of FIG. 8.1, in which a rolling element 40 is positioned in the pocket 78 of the cage 72. The flat end 80 of the pocket 78 with large radii 82, 84 extends under the inner ring, or rim 74. The roller end 38 is guided by the inner ring 74, providing a more robust cage 72 with clearance for the rolling element 40, minimizing potential failure due to stress risers from forming at the corners 86, 88 of the pocket 78.

FIG. 9 shows a top view of the axial bearing cage 28 of FIG. 5, in which a rolling element 40 is positioned in the pocket 34 of the cage 28. The curved end 36 provides a more robust cage 28 with additional clearance for the rolling element 40, minimizing potential failure due to stress risers from forming at the corners 60 of the pocket 34.

FIG. 10 shows a cross-sectional view of the axial bearing cage 28 and a rolling element 40 positioned in the pocket 34, between the radial roller guidance surface 62 of the formed ring flange 44 at the inner ring 30 and the pierced end 64 on the other side of the pocket 34. Alternatively, the formed ring flange 44 can be arranged to provide radial guidance at the outer ring 32 or at both the inner ring 30 and the outer ring 32 (see FIG. 13).

FIG. 11 shows a top view of the alternative axial bearing cage 46 of FIG. 7, in which a rolling element 40 is positioned in the pocket 52 of the cage 46. The curved end 54 provides a more robust cage 46 with clearance for the rolling element 40, minimizing potential failure due to stress risers from forming at the corners 66 of the pocket 52.

Figure 14:
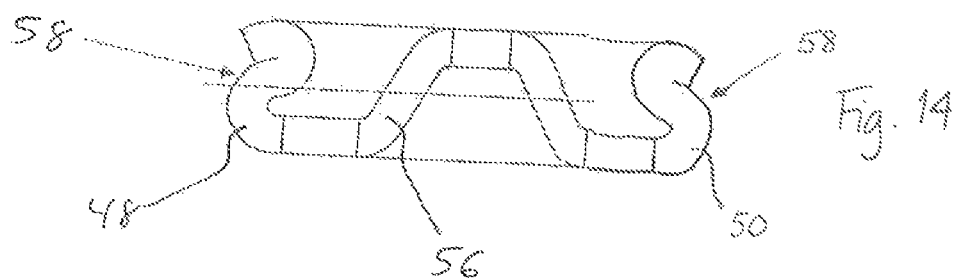
FIG. 14 is a cross-sectional view of a cage according to another embodiment.

FIG. 12 shows a cross-sectional view of the alternative axial bearing cage 46 and a rolling element 40 positioned in the pocket 52, between the radial roller guidance surface 68 of the formed ring flange 58, resembling an S-shape, at the inner ring 48 and the pierced end 70 on the other side of the pocket 52. Alternatively, the formed ring flange 58 can be arranged to provide radial guidance at the outer ring 50 or at both the inner ring 48 and the outer ring 50 (see FIG. 14).

The present invention has been described with reference to a preferred embodiment. It should be understood that the scope of the present invention is defined by the claims and is not intended to be limited to the specific embodiment disclosed herein.

What is claimed:

1. A roller bearing cage, comprising:
   an inner ring;
   an outer ring; and
   a plurality of cage bars extending between the inner ring and the outer ring so as to form a plurality of pockets, at least one of the inner ring and the outer ring having a formed ring flange protruding inwardly into the pockets with the pockets being formed so as to extend under the ring flange.

2. The roller bearing cage of claim 1, wherein the pockets have at least one curved end with a radius.

3. The roller bearing cage of claim 1, wherein the pockets have at least one straight end.

4. The roller bearing cage of claim 1, wherein the inner ring has the formed ring flange.

5. The roller bearing cage of claim 1, wherein the outer ring has the formed ring flange.

6. The roller bearing cage of claim 1, wherein both the outer ring and the inner ring have a ring flange that protrudes inwardly into the pockets.

7. The roller bearing cage of claim 1, wherein the pockets are pierced.

8. The roller bearing cage of claim 1, wherein the cage is for one of an axial roller bearing and a thrust roller bearing.

9. The roller bearing cage of claim 1, wherein the formed ring flange is curled inwardly.

10. The roller bearing cage of claim 1, wherein the formed ring flange is parallel to at least one of the inner ring and the outer ring.

11. The roller bearing cage of claim 1, wherein the formed ring flange is S-shaped.

12. The roller bearing cage of claim 1, wherein rolling elements are positioned within the pockets.

* * * * *